Figures 1, 2:
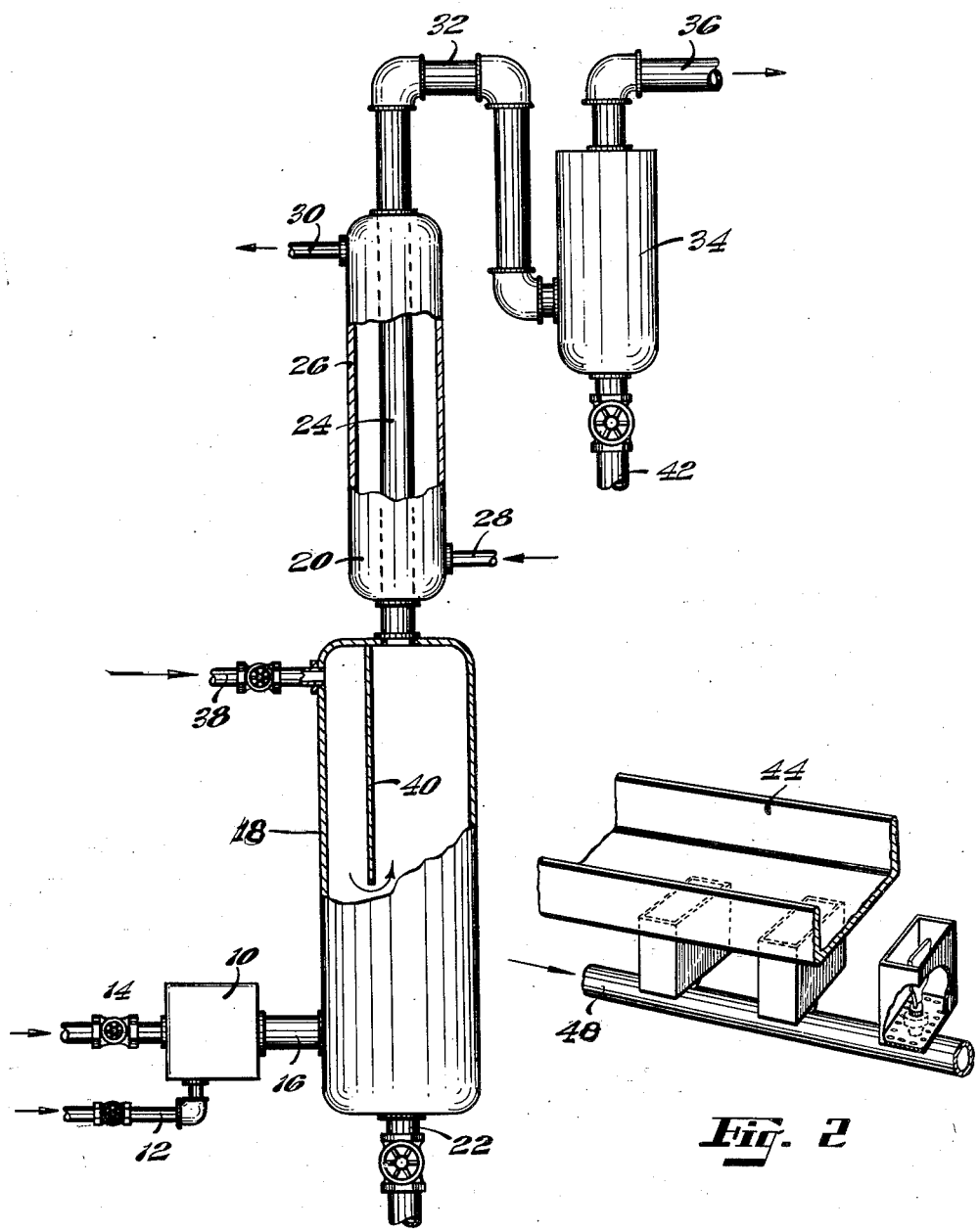

Jan. 5, 1954  M. E. JORDAN  2,665,194
PRODUCTION OF CARBON BLACK FROM AEROSOLS
Filed April 5, 1950

Inventor.
Merrill E. Jordan
by
Kenway, Jenney, Witter & Hildreth
Attys.

Patented Jan. 5, 1954

2,665,194

UNITED STATES PATENT OFFICE 2,665,194

PRODUCTION OF CARBON BLACK FROM AEROSOLS

Merrill E. Jordan, Walpole, Mass., assignor to Godfrey L. Cabot, Inc., Boston, Mass., a corporation of Massachusetts Application April 5, 1950, Serial No. 154,016

8 Claims. (Cl. 23—209.8)

This invention relates to the production of carbon black and more particularly to a method of producing carbon black of channel grade from gas enriched with liquid hydrocarbons whereby greatly increased yields of carbon black may be achieved. This invention is particularly useful in the production of channel process carbon black.

Heretofore, natural gas has been the primary raw material for the production of carbon black. However, although natural gas contains about 35 pounds of carbon per 1000 cubic feet of gas, only a small portion of that carbon is recoverable as carbon black. A yield of 2½ pounds of black per 1000 cubic feet of gas burned in a channel plant is considered phenomenally high and that is obtainable only when producing the lowest quality blacks. Furthermore, such yield is achieved only by equipping each channel hothouse with various air guiding and baffling devices. For the higher qualities (smaller particle size and greater intensity of blackness) yield must be sacrificed so that the finest and blackest of the channel blacks are obtained only at yields in the neighborhood of about ¼ of a pound per 1000 cubic feet, or less than ¾ of one per cent of the carbon in the gas.

Higher yields are obtainable by the furnace process but only at the expense of quality. At a maximum yield of about 14 pounds of black per 1000 cubic feet of gas the black particles are relatively very large and distinctly gray in tone thus limiting their usefulness both in paints and inks and in rubber. For comparable quality (color and rubber reinforcing effect) within the range of respective possibilities the yields of black from the channel and furnace processes are about the same.

It has been found that yield of black can be greatly increased by adding liquid hydrocarbons in a novel manner to the natural gas. Certain difficulties are encountered in so doing, however. In the furnace process, as the proportion of oil to gas becomes significant the resulting black is no longer exclusively gas black but tends to have certain characteristics peculiar to the oil blacks, the most notable being high structure. Furthermore, it is impossible to reproduce the finest and blackest of the channel blacks by any furnace process, with or without oil enrichment. On the other hand, while high oil loading of the gas does not appear to add structure to channel blacks produced therefrom it has not been possible to achieve such loading with oil in the liquid state because of the propensity of the oil to plate out on the walls of the pipes and plug the burner tips in short order. Only by first converting the oil to vapor before mixing with the gas and by maintaining the temperature of the conduits above the condensation temperature (600–800° F.) of the oil used has it been possible to utilize oil successfully in the channel process. (For example, see U. S. Letters Patent Nos. 491,923, Cabot and 1,838,316, Lewis.)

In spite of increased yield, however, oil vapor enrichment has certain disadvantages. For one thing, black quality falls off, color intensity decreases about two points on the nigrometer scale, unless other operating conditions are changed in the direction of lower yield. For another, it is obviously difficult and expensive to heat 10 to 14 million cubic feet of gas per 24 hour day for every 60 hot house channel plant unit as well as to keep miles of pipe hot. It is believed that no one has ever employed oil vapor enrichment in channel black production on any large scale in the United States. Furthermore only those oils that are readily vaporizable, and hence the more expensive oils, are capable of such use.

It is the principal object of my invention to provide a simple and inexpensive process for the production of channel carbon blacks at greatly increased yields from gas enriched with hydrocarbons in the liquid state.

It is also an object of my invention to provide a process of enriching gas with liquid hydrocarbons in such manner that the liquid hydrocarbons will not separate out significantly nor clog orifices.

It is also an object of my invention to provide a process whereby any liquid hydrocarbon may be used in admixture with gas for the production of carbon black by the channel, furnace or thermal process.

It is also an object of my invention to provide a process whereby liquid hydrocarbons may be carried in a gas through pipes at ordinary temperatures for any desired distance throughout a carbon black plant to a reaction zone.

It is also an object of my invention to provide a process for enriching gas with any type of liquid hydrocarbon, including residual fuel oils not fully vaporizable by ordinary distillation techniques at atmospheric conditions.

It is a further object of my inventoin to provide a process for satisfactorily enriching gaseous raw materials with liquid hydrocarbons whereby production and yield of carbon black may greatly be increased under any given operating conditions without lowering quality.

I accomplish these and other objects of my invention by adding to a carrier gas liquid hydrocarbon in the form of a very fine mist or fog and in relatively low concentration and conveying the resulting mixture to the carbon black production zone. The size of the oil droplets and the degree of concentration are such that a highly stable suspension, or aerosol, of oil and gas results. Any liquid or solid hydrocarbon which will dissociate to carbon and which can be made into a stable aerosol can be used for the purposes of my invention. Also any gas may be used as a carrier gas, providing combustion of the mist can be maintained, although natural gas, hydrogen or other high B. t. u. gas are preferred. It is merely necessary that a stable aerosol be formed.

The technical definition of an aerosol is a colloidal system of liquid particles suspended in a gaseous medium. More commonly the term aerosol includes suspensions of particles well above colloidal size (colloidal size being around .1 micron), even including particles as large as 80 microns in diameter. For the purposes of this invention an aerosol is defined as being a gaseous suspension of liquid particles which is satisfactorily stable under the conditions of flow encountered in carbon black production and from which there will be little or no important separation of sol from gas during flow between the points of aerosol generation and use.

The stability of an aerosol in any given system depends principally upon the size of the sol particles and secondarily upon the degree of their concentration in the gaseous medium. Any aerosol will separate out given suitable conditions and adequate time. The separation will not be significant if the particles are small enough and are sufficiently spaced apart to escape collision with one another and subsequent growth. Likewise if turbulence is present separation out will be inhibited. Consequently in dealing with the aerosol contemplated by my invention these various factors must be taken into consideration.

Although any gaseous suspension of liquid particles may be termed an aerosol those areosols satisfactory for the purposes of my invention cannot be defined so broadly. As I have said, the criterion of operability of an aerosol in the practice of my invention is stability and this depends upon the factors of particle size and concentration in the gas. These factors are variable depending upon the oil used. When forming the areosol from a heavy residual tar a high degree of subdivision is essential. It would seem that best results are achieved when the individual particles do not exceed about 1 micron in diameter and preferably average less than half a micron. On the other hand, with a light distillate oil the particles may be as large as 10 microns and still evidence satisfactory stability under the flow conditions encountered. However, permissible particle size is subject to considerable variation and I do not mean to limit the practice of my invention to aerosols composed only of particles of the sizes in the ranges discussed above and in the concentrations discussed below.

To the same effect is the factor of concentration of oil in the carrier gas. As concentration of particles increases the incidence of collosion between the particles likewise increases. When two particles collide they merge as one of double the original individual sizes. With resulting increase in particle size stability of the areosol naturally decreases. For the residual tars a maximum concentration of about 2½% tar by weight of the aerosol (less than ⅕ gallon of tar per 1000 cu. ft. of natural gas) is optimum. On the other hand higher concentrations are permissible, particularly for the lighter oils.

It is thus apparent that the areosol enrichment of my invention is infinitely superior to enrichment of gas by oil in the vapor phase. It has still another advantage incident to my invention. When oil is carried in the gas as a vapor and passes through the burner tips in that state there is a lowering of quality of the black as I have pointed out above. On the other hand, when adding oil as an aerosol to gas the increase in yield of black is fully as great as with vaporized oil and, in addition, there is no change whatsoever in the quality of the black. Thus my invention is adaptable to any existing system of carbon black production and no substantial adjustments in operating conditions are required for successful utilization of the oil aerosol.

In carrying out the process of my invention the aerosol may be first formed in some convenient manner as hereinafter discussed. Thereafter the gas and oil aerosol is introduced into the network of pipes leading to and into the channel hot houses. The oil sol may thus be conveyed for any desired distance through any existing system of pipes without the necessity of applying external heat. In a number of runs of many hours' duration using Bunker C, a mixture of many residual petroleum oils and tars, as enriching oil and passing the resulting aerosol through extensive lengths of small diameter pipe and through the very small channel burner tips there was no trace of oil deposition on the pipe walls nor of tip clogging or coking.

Runs have been made using all types of oil from the distillate gas-oils, which are easily vaporizable, to heavy residual tars which are not more than 50% vaporizable by ordinary distillation techniques at atmospheric conditions, and increases have been achieved in yield of carbon black from all such oils, likewise without changing the quality of the black and without plating, clogging or coking.

As has been pointed out, any convenient method may be employed for the formation of a suitable aerosol. I prefer to use a combination of mechanical and thermal methods. To achieve sufficient subdivision of the oil by the application of mechanical shearing forces alone requires the use of considerable power. Furthermore no single known mechanical atomizer is sufficiently versatile to handle all types of oils. And even if satisfactory fineness of subdivision could be achieved by mechanical atomization, the resulting droplets are neither symmetrical in shape nor of uniform size. On the other hand, when sol particles are formed by first atomizing and vaporizing the oil and then condensing it on sub-microscopic nuclei present in the carrier gas, the particles are very small, are perfectly spherical and are all practically the same size, these factors all making for great aerosol stability.

It has been found that one satisfactory way of forming an excellent aerosol by the thermal method is to atomize the enriching oil very finely with the carrier gas and to spray this finely atomized oil into a heated chamber. At sufficiently high temperatures, and 900° F. has been found to be the maximum required for the heaviest of the oils tested, the oil droplets will be flash vaporized in this chamber and can then be passed on through a condenser where the oil will condense on the nuclei present.

Any conventional type of condenser may be used for the purpose. Both a water jacketed tube vertically disposed and an air condenser have been successfully used. As condensation takes place on the nuclei those particles that are larger than the critical size will fall back into the vaporization chamber and only the stably suspended particles will pass on through the system.

Any liquid hydrocarbon which has been atomized to sufficiently small drop size may be further subdivided by being heated rapidly to high temperatures and then being uniformly cooled. The required degree of atomization depends upon the type of liquid hydrocarbon concerned. By reducing the ratio of droplet volume to surface area sufficiently for the particular liquid its vapor pressure may be made to overcome its surface tension to achieve further subdivisions. Those oils that are easily vaporized at low temperatures, such as the distillate gas-oils, need not be finely atomized, whereas the heavy tars must be very finely sub-divided and heated to relatively higher temperatures. It is not difficult to achieve the degree of atomization and temperature required for any oil.

It will readily be apparent that production of a satisfactory aerosol by this thermal method depends upon the existence of nuclei within the system on which the vaporized oil may be caused to condense. Natural gas used in the commercial production of carbon black normally contains a substantial quantity of microscopic liquid and solid particles which function as nuclei. A more efficient aerosol may be generated when additional nuclei are made available and it is another feature of my invention to make provision for such additional nuclei.

This feature of the invention consists in introducing a gaseous nuclei-carrying medium with the carrier gas into the vapor formation section of the aerosol generator. This medium and the vaporized oil become intimately mingled and in the condenser the oil tends to condense on the particles present in the added medium. The resulting aerosol is thus of uniform density and the majority of sol particles appear to be generally of the same size, all making for high stability.

The characteristics and objects of the invention will be best understood and appreciated from the following description, a preferred embodiment of apparatus for carrying it into effect, selected for purposes of illustration and shown in the accompanying drawings, in which:

Fig. 1 is a diagrammatic view in elevation of apparatus for generating aerosols with certain elements shown in partial section, and Fig. 2 is a view in perspective of the elements providing the reaction zone for forming carbon black.

The illustrated apparatus includes an atomizer 10 which may be of any suitable commercial type. The oil, which may advantageously be preheated, is introduced into the atomizer through a pipe 12 and the carrier gas through a pipe 14. The oil after being finely subdivided by atomization may be further subdivided by impingement of the atomized mixture and, as herein shown, this may be effected in a cylindrical vertically disposed chamber 18 with which the atomizer communicates through a short horizontal duct 16. The mixture of gas and atomized oil passes through the duct 16 and impinges against the far wall of the chamber or against an intermediate baffle plate therein.

The chamber 18 is maintained at a temperature sufficiently high to flash vaporize the oil droplets as they arrive in the gas stream. The gas and vaporized oil are then directed upwardly to an overhead condenser 20, herein shown but not necessarily, consisting of a central conduit 24 surrounded by a cylindrical casing 26 providing a water jacket. Those oil drops too large to be vaporized, if any, will fall to the bottom of the chamber 18 and may be drawn off through an outlet pipe 22.

The water jacket of the condenser is supplied with cooling water, brine or the like through an inlet pipe 28 near the bottom of the condenser and this is discharged through a pipe 30 at the top of the condenser. The temperature of the central conduit 24 is thus maintained at a temperature low enough to condense the oil vapor upon the nuclei passing in the gas stream. Those particles that grow too large fall back by gravity against the up-flowing gas stream and may either be revaporized or fall to the bottom of the chamber 18.

The aerosol then flows through an outlet pipe 32, through a connected trap 34 and thence into the carbon black production system through a pipe 36. While it is desirable to utilize a trap as a protective measure, this may not be necessary in many cases. Using the apparatus described in carrying out the process of my invention the aerosol produced is so stable that no perceptible separation of the oil from the gas occurs after leaving the condenser.

As a further test of aerosol stability the aerosol may be conducted, at a point remote from its origin, through an electrical precipitator. The amount of oil recovered from the gas in the precipitator will be found to be equal to that originally added in forming the aerosol. Also, on fractionating the precipitated oil the same cuts are found, and in the same proportions, as were present in the charging stock.

As heretofore intimated, the characteristics of the aerosol may be improved by introducing a nuclei-carrying medium, such as the vapor of ammonium chloride, sodium chloride, or the like, into the vaporization chamber 18. These vapors, mixed with carrier gas, may be advantageously introduced into the top of the vaporizing chamber 18 through a pipe 38 and directed downwardly toward the atomized oil spray by means of baffle 40.

Upon leaving the trap 34 the hydrocarbon aerosol may be delivered through the pipe 36 and suitable connections to the burner pipes 48 of a channel black hot house as suggested in Fig. 2. These burner pipes are provided with a series of spaced burner tips preferably provided with shields which direct hydrocarbon flames against the surface of overhead channel irons 44. The carbon black thus deposited upon the impinged surface is removed by longitudinal movement of the channel irons over scrapers and falls into a collecting trough from which it is removed by a screw conveyor not shown. The flames provide the carbon black forming reaction zone requisite for carrying out the channel process of producing carbon black.

Illustrative of the accomplishments of my invention is the following example in which a number of runs in channel carbon black production units with and without aerosol enrichment are compared. The runs shown under the general headings of tests 1 to 3 were made in a laboratory three-burner tip oven. Those runs under tests 4 and 5 were made in one hot house of a commercial channel plant in Texas.

Example I

| Type of fuel | Gas flow, cu. ft./hr. | Lbs. of liquid fuel/hr. | Amount of black made, lbs./hr. | Percent of theoretical yield [1] | Percent improvement over control |
|---|---|---|---|---|---|
| Test 1: | | | | | |
| Control 1—Natural gas | 8.7 | None | 0.0117 | 3.70 | |
| Run 1—Aerosol bunker C in natural | 7.90 | 0.0126 | .0162 | 5.30 | 43.2 |
| Test 2: | | | | | |
| Control 1—Natural gas | 8.90 | None | .0138 | 4.28 | |
| Control 2—Natural gas | 8.30 | None | .0132 | 4.36 | |
| Run 1—Aerosol tar L-gas | 9.85 | .00622 | .0178 | 4.86 | 11.5 |
| Run 2—Aerosol bunker C—gas | 8.38 | .00825 | .0166 | 5.36 | 22 |
| Run 3—Aerosol bunker C-gas | 9.52 | .0186 | .0232 | 6.35 | 45.0 |
| Test 3: | | | | | |
| Control 1—Natural gas | 10.2 | None | .0100 | 2.82 | |
| Run 1—Vapor phase aromatic distillate gas | 9.5 | .0256 | .0121 | 3.11 | 10.7 |
| Test 4: | | | | | |
| Control 1—Natural gas | 7,100 | None | 15.5 | 6.02 | |
| Control 2—Natural gas | 7,270 | None | 15.8 | 5.97 | |
| Run 1—Aerosol Republic distillate-natural gas | 7,180 | 2.3 | 16.8 | 6.38 | 6.3 |
| Run 2—Aerosol Republic distillate-natural gas | 7,140 | 9.95 | 20.4 | 7.46 | 24.3 |
| Run 3—Aerosol Republic distillate-natural gas | 7,240 | 10.00 | 20.4 | 7.57 | 26.2 |
| Test 5: | | | | | |
| Control 1—Natural gas | | None | 7.7 | 2.72 | |
| Run 1—Aerosol aromatic distillate natural gas | | 10.08 | 14.3 | 3.85 | 41.6 |

| Scale [2] | | Volatile, percent by weight | Surface area [3] (sq. m./gm.) | DPG adsorption | Length of run | Percent enrichment by weight |
|---|---|---|---|---|---|---|
| Test 1: | | | | | Hrs. | |
| Control 1 | 81.0 | 4.3 | | | 3 | None |
| Run 1 | 80.5 | | 123 | | 4 | 2.8 |
| Test 2: | | | | | | |
| Control 1 | 81.3 | | | | 2.5 | None |
| Control 2 | 80.5 | | 144 | | 3.0 | None |
| Run 1 | 80.4 | | | | 3.5 | 1.2 |
| Run 2 | 80.5 | 4.1 | 113 | | 4.0 | 1.8 |
| Run 3 | 80.7 | | | 25.3 | 3.83 | 3.6 |
| Test 3: | | | | | | |
| Control 1 | 73.7 | 5.1 | | | 3 | None |
| Run 1 | 75.8 | 5.8 | | | 6 | 4.6 |
| Test 4: | | | | | | |
| Control 1 | 80.0 | 4.4 | 127 | 28.1 | | None |
| Control 2 | 80.0 | | | | | None |
| Run 1 | 80.0 | | | | | .61 |
| Run 2 | 80.2 | 4.6 | 117 | | | 2.54 |
| Run 3 | 80.9 | | | | | 2.53 |
| Test 5: | | | | | | |
| Control 1 | 69.9 | | | | | None |
| Run 1 | 69.9 | 4.1 | 286 | 54 | | None |

[1] Theoretical yield = 36.4 lbs. carbon/1000 cu. ft. natural gas at 760 mm. and 60° F.
[2] Decreasing scale means increased blackness.
[3] Nitrogen adsorption.

It is likewise apparent that the rubber properties of the blacks produced by the practice of my invention at higher production rates and yields are essentially identical to those of blacks produced from natural gas alone under otherwise identical conditions. The following example, comparing synthetic rubber (GR–S) compounded with black from control 1 and run 2, respectively, of test 4 set forth in Example I, is illustrative:

Example II

| | P. s. i. 300% | Mod. at 400% | P. s. i. tens. | Percent elong. | Shore A2 hardness |
|---|---|---|---|---|---|
| Run 2 | 1,250 | 2,080 | 3,920 | 690 | 69 |
| Control 1 | 1,200 | 2,080 | 4,100 | 650 | 69 |

| | 60' hyst. | Elec. res. | Percent control run | | ML, 4' at 212° F. visc. | Percent extrusion shrinkage |
|---|---|---|---|---|---|---|
| | | | Rebd. | Abr. | | |
| Run 2 | 0.283 | 7.48 | 101.8 | 98 | 58 | 59.5 |
| Control 1 | .287 | 2.26 | 100.0 | 100 | 61 | 60.5 |

Having thus disclosed my invention and described in detail a preferred manner of practicing it, I claim as new and desire to secure by Letters Patent:

1. An improved process for the production of channel carbon black comprising the steps of mixing and atomizing at an elevated temperature a normally liquid hydrocarbon in a gas composed of normally gaseous hydrocarbons and containing sub-microscopic solid nuclei, cooling said mixture so that an aerosol is formed in which substantially all of the liquified particles are formed on the nuclei and remain in suspension while the gas continues to flow, conducting the gas and suspended liquid hydrocarbon to a plurality of burners, burning a portion thereof in open flames to dissociate the remainder to carbon black, impinging the flames against a relatively cool surface, and collecting the deposited carbon black.

2. The process of claim 1 in which the liquid particles constitute no more than about 3% by weight of the aerosol.

3. The process of claim 1 in which substantially all of the liquid hydrocarbon particles of the aerosol are less than 10 microns in diameter.

4. The process of claim 1 in which the gaseous hydrocarbon is predominantly methane.

5. The process of claim 1 in which substantially all of the liquid hydrocarbon particles of the aerosol are less than 10 microns in diameter.

6. An improved process for the production of channel carbon black comprising the steps of first forming an aerosol of a combustible gas and a liquid hydrocarbon by continuously introducing an atomized spray of the liquid hydrocarbon, ammonium chloride vapors and a stream of the gas into a heated space, vaporizing the liquid hydrocarbon therein, condensing the liquid hydrocarbon upon the nuclei normally present in the gas and additionally provided by the ammonium chloride vapors, and settling out those liquid hydrocarbon particles which are too large to remain suspended in the gas stream, then conducting the aerosol to an impingement combustion zone, burning a portion thereof in open flames to dissociate the remainder to carbon black, and collecting the carbon black deposited by impingement.

7. An improved process of making channel carbon black characterized by the steps (1) of atomizing a heavy residual tar in a stream of natural gas at a concentration not in excess of about 2½% tar, (2) flash vaporizing the tar droplets, (3) condensing the tar vapor upon the nuclei present in the atomizing natural gas and at the same time (4) eliminating particles from the resulting aerosol that exceed 1 micron in diameter, and then (5) directing the stable aersol thus produced through heated pipes to an impinging combustion zone, and (6) collecting the carbon black deposited thereat.

8. An improved process for the production of channel carbon black comprising the steps of atomizing at an elevated temperature a normally liquid hydrocarbon in a carrier gas composed predominantly of hydrogen and containing submicroscopic solid nuclei and thereby mixing the hydrocarbon and carrier gas and vaporizing the hydrocarbon, cooling said mixture so that an aerosol is formed in which substantially all of the liquified particles are formed on the nuclei and remain in suspension while the gas continues to flow, conducting the gas and suspended liquid hydrocarbon to a plurality of burners, burning a portion thereof in open flames to dissociate the remainder to carbon black, impinging the flames against a relatively cool surface, and collecting the deposited carbon black.

MERRILL E. JORDAN.

References Cited in the file of this patent

UNITED STATES PATENTS

| Number | Name | Date |
|---|---|---|
| 343,446 | Dysart | June 8, 1886 |
| 491,923 | Cabot | Feb. 14, 1893 |
| 1,264,796 | Hirt | Apr. 30, 1918 |
| 1,514,638 | Thomas | Nov. 11, 1924 |
| 1,993,316 | Blackwood et al. | Mar. 5, 1935 |
| 2,081,130 | Atwell | Mar. 25, 1937 |
| 2,375,796 | Krejci | May 15, 1945 |
| 2,432,577 | Levey et al. | Dec. 16, 1947 |